US010959384B2

(12) United States Patent
Nelson et al.

(10) Patent No.: US 10,959,384 B2
(45) Date of Patent: Mar. 30, 2021

(54) PLANT SUBSTRATE GROWING MEDIUM

(71) Applicant: Veritas Substrates, LLC, Watsonville, CA (US)

(72) Inventors: Steven Douglas Nelson, Watsonville, CA (US); Michael Dean Nelson, Watsonville, CA (US); Daniel Steven Nelson, Watsonville, CA (US); David Johnston, Bridgwater (GB); Scott Charles Nelson, Watsonville, CA (US)

(73) Assignee: VERITAS SUBSTRATES, LLC, Watsonville, CA (US)

( * ) Notice: Subject to any disclaimer, the term of this patent is extended or adjusted under 35 U.S.C. 154(b) by 0 days.

(21) Appl. No.: 16/018,961

(22) Filed: Jun. 26, 2018

(65) Prior Publication Data

US 2019/0387695 A1 Dec. 26, 2019

(51) Int. Cl.

| *A01G 24/25* | (2018.01) |
|---|---|
| *C05F 5/00* | (2006.01) |
| *A01G 22/05* | (2018.01) |
| *A01G 22/15* | (2018.01) |
| *A01G 22/20* | (2018.01) |
| *A01G 22/22* | (2018.01) |
| *A01G 22/35* | (2018.01) |
| *A01G 22/40* | (2018.01) |
| *A01G 22/45* | (2018.01) |
| *A01G 22/50* | (2018.01) |

(Continued)

(52) U.S. Cl.
CPC ............ *A01G 24/25* (2018.02); *A01G 22/05* (2018.02); *A01G 22/15* (2018.02); *A01G 22/20* (2018.02); *A01G 22/22* (2018.02); *A01G 22/25* (2018.02); *A01G 22/35* (2018.02); *A01G 22/40* (2018.02); *A01G 22/45* (2018.02); *A01G 22/50* (2018.02); *A01G 22/60* (2018.02); *A01G 22/63* (2018.02); *C05F 5/002* (2013.01); *A01C 21/00* (2013.01)

(58) Field of Classification Search
CPC ........ A01G 24/00; A01G 24/20; A01G 24/22; A01G 24/25
See application file for complete search history.

(56) References Cited

U.S. PATENT DOCUMENTS

| 5,802,763 A | 9/1998 | Milstein et al. |
| 9,045,379 B2 * | 6/2015 | Nelson .................... C05F 11/00 |

(Continued)

FOREIGN PATENT DOCUMENTS

ES 2286917 A1 12/2007

OTHER PUBLICATIONS

Melissa, Confessions of a Composter, Oct. 17, 2012, Hamilton County Recycling and Solid Waste District, http://confessionsofacomposter.blogspot.com/2012/10/composting-nuts.html (Year: 2012).*

(Continued)

*Primary Examiner* — Kristen C Hayes
(74) *Attorney, Agent, or Firm* — Pilloff Passino & Cosenza LLP; Sean A. Passino; Rachel K. Pilloff

(57) ABSTRACT

Provided herein are methodology and composition for use of any nut (such as almond, walnut, or pistachio) or legume (peanut) shell and/or husk material in a growing substrate, with or without other components such as peat, perlite, or coir; for plant growth, whether it be used in its whole form or some reduced form such as, having been chipped or ground, and whether composted or not.

11 Claims, 2 Drawing Sheets

(51) Int. Cl.
*A01G 22/60* (2018.01)
*A01G 22/63* (2018.01)
*A01G 22/25* (2018.01)
*A01C 21/00* (2006.01)

(56) References Cited

U.S. PATENT DOCUMENTS

2015/0113871 A1* 4/2015 Nelson .................. C05F 11/00
47/58.1 FV
2016/0000002 A1* 1/2016 Bibaud ................ A01G 24/00
47/56
2017/0175394 A1* 6/2017 Simmons ............. E04D 11/002

OTHER PUBLICATIONS

Özçelik et al, Hazelnut husk as a substrate for the cultivation of shiitake mushroom, Oct. 2007, Bioresource Technology, vol. 98, 2652-2658 (Year: 2007).*
Duc et al, Groundnut shell—a beneficial bio-waste, Jul. 2019, Biocatalysis and Agricultural Biotechnology, vol. 20 (Year: 2019).*
Omidi et al, Application of Peanut Shells Composts in Replacement with Peat on Growth Indices and Physical and Chemical Properties of Violet Growth Media (*Viola* spp) in Outdoor, Nov. 2017, Frontiers in Environmental Microbiology, (Year: 2017).*
Valverde, Use of almond shell and almond hull as substrates for sweet pepper cultivation. Effects on fruit yield and mineral content, 2013, Spanish Journal of Agricultural Research (Year: 2013).*
Cattivello et al, Evaluation of almond shells as cover material and minor component of substrates for young plants , 2017, ISHS (Year: 2017).*
Urrestarazu et al, Almond shell waste: possible local rockwool substitute in soilless crop culture, Feb. 2005, Scientia Horticulturae, vol. 103, Issue 4, pp. 453-460 (Year: 2005).*
Almonds, Feb. 20, 2018, AGRA Marketing GRP, https://web.archive.org/web/20180220162305/https://www.agramarketing.com/by-products/almonds, (Year: 2018).*
Michelle. "Confessions of a Composter", Publication Date: Oct. 17, 2012, Retrieval Date: Oct. 24, 2018, http://confessionsofacomposter.blogspot.com/2012/10/composting-nuts.html.
G.E. Barrett et al. "Achieving environmentally sustainable growing media for soilless plant cultivation systems—A review" Scientia Horticulturae, Oct. 8, 2016, pp. 220-234, vol. 212, Elsevier.
"Wonderful Pistachios," Sep. 8, 2016; Retrieval Date: Nov. 28, 2018, https://twitter.com/WonderfulNuts/status/774035594204753921.
"In Shell Walnuts," Apr. 26, 2015, Retrieval Date: Nov. 28, 2018, https://www.amazon.com/Shell-Walnuts-Pound-Bag-Nuts/dp/B00BWV22DE/ref=sr_1_3_a_it?ie=UTF8&qid=1543426551&sr=8-3&keywords=walnut%2Bshell&th=1.
"Compost," Publication Date: May 28, 2018, Retrieval Date: Oct. 24, 2018, https://en.wikipedia.org/w/index.php?title=Compost&oldid=843281009.
Miguel Urrestarazu et al., "Almond shell waste: possible local rockwool substitute in soilless crop culture," Scientia Horticulturae, Jun. 9, 2004, pp. 453-460, vol. 103, Elsevier.
A. Baley, "Can You Compost Nuts: Information About Nut Shells in Compost," Publication Date: Apr. 4, 2018; Retrieval Date: Oct. 24, 2018, https://www.gardeningknowhow.com/composting/ingredients/nut-shells-in-compost.htm.
International Search Report and Written Opinion for PCT/US18/49146, dated Dec. 13, 2018.
Liz Baessler, "Growing in Compost Without Soil: Facts on Planting in Pure Compost," Jul. 2016, https://www.gardeningknowhow.com/garden-how-to/soil-fertilizers/planting-in-pure-compost.htm, accessed Aug. 30, 2019.
D. Montané et al, "The fractionation of almond shells by thermo-mechanical aqueous-phase (TM-AV) pretreatment," Biomass and Bioenergy, May 1993, pp. 427-437, vol. 4, No. 6.
Office action for Chile Application No. 2781-2018, dated Apr. 2, 2020.

* cited by examiner

PLANT SUBSTRATE GROWING MEDIUM

FIELD

The present disclosure relates to the field of horticulture. More specifically, the present disclosure provides material and methodology for plant growth, such as, but not limited to small fruit production.

INTRODUCTION

Soil provides support, nourishment, and aeration to the host plant, which facilitates plant growth and development. For example, a soil should support a growing plant by holding roots stationary, retaining moisture and providing nutritional elements in a form easily absorbed by the plant, while permitting oxygen exchange in the root zone. Additionally, a soil should provide adequate drainage so as to prevent water logging, and be free of pathogens that could prove detrimental to the plant.

Most naturally occurring soils, however, do not have all of the above-mentioned characteristics. Synthetic soils, commonly referred to as potting soils, have been used extensively in the horticultural industry and, when properly designed, can be superior to naturally occurring soils as a growing medium. Most synthetic soils contain nitrogen, phosphorous, and potassium, in addition to other minerals and elements that promote plant growth.

SUMMARY

Provided herein are methodology and composition for use of any nut (such as almond, walnut, or pistachio) or legume (peanut) shell or husk material in a growing substrate, with or without other components such as peat, perlite, and/or coir; for plant growth, whether it be used in its whole form or some reduced form such as, having been chipped or ground whether composted or not.

In one aspect, provided herein is methodology for producing a fruit, comprising growing a fruit plant or part thereof in a composition comprising almond hulls, shells, and/or husks, or a substrate derived directly from almond hulls, shells, and/or husks. In one embodiment, a fruit plant is a strawberry, raspberry (any color), blackberry, blueberry and/or black-raspberry plant. In another embodiment, a plant part thereof is a seedling, stolon, runner, seed, leaf, cane, or root cutting.

In another aspect, the disclosure provides a composition for producing a fruit, wherein said composition comprises almond hulls, shells, or husks. In one embodiment, a fruit is a strawberry, raspberry (any color), blackberry, blueberry and/or black-raspberry. In one embodiment, the composition is soilless. In another embodiment, said soilless composition is made by: (a) grinding almond husks, shells, and hulls to produce a range of size particles that are reconstituted to form crop specific substrates; (b) washing the substrates to remove unwanted particles and chemicals; (c) buffering to provide a safe growing medium; and (d) preparing media as bulk or grower packs.

In another aspect, Applicant provides the disclosure of a method for producing a strawberry, comprising growing a strawberry plant or part thereof in a medium comprising almond hulls, shells, or husks.

In another aspect, there is a method for producing a raspberry (any color), comprising growing a raspberry plant or part thereof in a medium comprising almond hulls, shells, or husks.

In another aspect, there is a method for producing a blackberry, comprising growing a blackberry plant or part thereof in a medium comprising almond hulls, shells, or husks.

In another aspect, there is a method for producing a blueberry, comprising growing a blueberry plant or part thereof in a medium comprising almond hulls, shells, or husks.

In another aspect, there is a method for producing a black-raspberry, comprising growing a black-raspberry plant or part thereof in a medium comprising almond hulls, shells, or husks.

In another aspect, provided herein is a method for producing a strawberry, raspberry, blackberry, blueberry and/or black-raspberry, comprising a) obtaining a substrate medium comprising crushed almond hulls, shells, or husks; b) planting a strawberry, raspberry, blackberry, blueberry, and/or black-raspberry plant or part thereof in said medium; and c) growing said plant or part thereof to maturity, wherein said plant produces a strawberry, raspberry, blackberry, blueberry, and/or black-raspberry. In one embodiment, said composition is a soilless growth media. In another embodiment, said soilless growth media is made by: (a) grinding almond husks, shells, and hulls to produce a range of size particles that are reconstituted to form crop specific substrates; (b) washing the substrates to remove unwanted particles and chemicals; (c) buffering to provide a safe growing medium; and (d) preparing media as bulk or grower packs.

In another aspect, there is a method for growing a small fruit plant, comprising: a) crushing almond hulls, shells, or husks to produce a substrate growth medium; b) planting a small fruit plant or part thereof in said medium; and c) growing said plant or part thereof to maturity, wherein said plant produces small fruits. In one embodiment, the fruit is a strawberry, raspberry, blackberry, blueberry and/or black-raspberry.

In another aspect, provided is a substrate medium for growing a fruit plant, wherein said medium comprises crushed or shredded or ground almond hulls, shells, or husks. In one embodiment, the medium is soilless. In one embodiment, a fruit is a strawberry, raspberry (any color), blackberry, blueberry and/or black-raspberry.

In another aspect, provided herein is a plant growth medium comprising whole unground almond shells. In one embodiment, the whole and unground almond shells are composted, washed, buffered, pH adjusted, and dried. In another embodiment, the medium is soilless. In another embodiment, the medium further comprises ground and buffered almond shells and hulls. In another embodiment, the whole and unground almond shells are composted. In another embodiment, the medium further comprises peat or coir.

In another aspect, provided is a plant growth medium comprising whole composted shells, husks, and/or hulls. In one embodiment, the medium comprises whole composted almond shells. In a further embodiment, the whole composted almond shells further comprise ground shells and/or husk/hull. In another embodiment, the medium comprises whole composted shells selected from almond shells, walnut shells, pecan shells, pistachio shells, and/or peanut shells.

In another aspect, provided is a soilless composition comprising whole and unground shells selected from the group consisting of almond, walnut, pistachio, pecan, and/or peanut. In one embodiment, the composition comprises whole and unground almond shells. In another embodiment, the composition comprises whole and unground walnut shells, pistachio shells, pecan shells, and/or peanut shells.

In another aspect, the disclosure provides a method of plant or fruit production, comprising (a) obtaining a substrate medium comprising whole and unground almond shells; (b) planting a plant in said medium; and (c) growing said plant to maturity. In one embodiment, the method further comprises composting said whole and unground almond shells. In another embodiment, the substrate medium further comprises ground and buffered almond shells and/or husks.

In another aspect, provided is a method of plant or fruit production, comprising (a) obtaining a substrate medium comprising composted unground composted almond shells; (b) planting a plant in said medium; and (c) growing said plant to maturity. In one embodiment, the whole and unground almond shells are buffered. In another embodiment, a plant is selected from the group consisting of tomato, potato, soybean, maize, turfgrass, rice, oat, wheat, barley, sorghum, orchid, iris, lily, onion, palm, pine, tobacco, eucalyptus, populus, liquidamber, acacia, teak, mahogany, cotton, tobacco, mustards, orange, apple, pear, cherry, peach, plum, melons, grapes, strawberry, blackberry, raspberry, blueberry, cranberry, loganberry, bananas, citrus, sugar beet, broccoli, cauliflower, celery, lettuce, spinach, eggplant, pumpkin, squash, cassava, sweet potato, pepper, poinsettia, geranium, almond, peanut, pistachio, walnut, bean, alfalfa, carrot, strawberry, lettuce, oak, maple, walnut, rose, mint, squash, daisy, geranium, avocado, artichoke, olives, coconut, jojoba, and cactus. In another embodiment, the plant is a small fruit selected from the group consisting of strawberry, raspberry, blackberry, blueberry, cranberry, loganberry, and/or black-raspberry.

BRIEF DESCRIPTION OF THE DRAWINGS

The accompanying drawings, which are incorporated in and constitute a part of this specification, illustrate features made possible by embodiments of the description and together with the description, serve to explain the principles.

DETAILED DESCRIPTION

Figure 1:
FIG. 1: Photograph of a red raspberry plant grown in whole composted almond shells, taken at 3 months post-planting.

Reference will now be made in detail to the embodiments, examples of which make it possible to produce features illustrated in the accompanying drawings.

The present inventors discovered materials and methods for growing plants, such as small fruit plants. In one aspect, the inventors discovered that agricultural by-products, such as nut and legume shells, could be used as or in a plant growth medium. For example, and in no way limiting, the present inventors contemplate using almond hulls, shells, or husks for use in a plant growth medium for growing small fruit plants, such as strawberry, raspberry, blackberry, blueberry, or black-raspberry. Of course, hulls, shells, or husks from any plant may be used, such as but not limited to almond, walnut, pistachio, pecan, peanut, and the like, and may be used for growing any plant.

Thus, the present inventors provide a new use for agricultural waste products, such as almond hulls, shells, or husks. In this regard, the present disclosure provides materials and methodology for converting agricultural by-product into a composition suitable for plant growth and development, while simultaneously reducing the accumulation of a waste product. The present materials and methodology may provide a plant, such as a small fruit plant, with growth habitat that is equal or superior to commercial potting soils or naturally occurring topsoils.

As detailed below, the present inventors contemplate a plant growth media comprising hulls, shells, and husks. In this regard, they discovered that whole composted shells and whole composted husks, as opposed to milled or otherwise ground shells and husks, may support better plant growth. This goes against conventional growth practices, where the grinding, chipping, and shredding of materials may help plant growth by increasing surface area for microorganisms, creating a more homogenous mixture of sized particles for aeration, and providing improved insulation for maintaining optimum temperatures.

Technical terminology in this description conforms to common usage in horticulture, biochemistry, agriculture, and the like. This usage and these technical terms are explicated in: Soils and Other Growth Media SBN 333125711 The Macmillan Press and Strawberries ISBN 0-85199-339-7 and Integrated Pest Management For Strawberries ISBN 978-1-60107-489-8.

As most commonly known "nut" plants, such as almonds, walnuts, pistachios, and/or peanuts, are not actually true nuts in the botanical sense, the present description uses the terms seed, nut, and kernel interchangeably. One of ordinary skill in the art understands that depending on the plant, the so-called "nut" may in fact qualify as a seed or kernel. That is, for example, the edible nut from an almond is a kernel, whereas the edible nut from a walnut and a pecan is a seed. For a legume such as a peanut, the edible nut is a seed enclosed in the pod.

As used herein, and in reference to growing these so-called nut plants and harvesting nuts, a "husk" or "hull" refers to the outer, leathery pericarp (exocarp) covering, produced from fused sepal and petal bases. The husk or hull houses a hard shell containing a seed, kernel, or nut. When ripe, the husk or hull dries and dehisces, thereby exposing the hard shell containing the seed, nut, or kernel. Depending on the plant, one of ordinary skill in the art would understand if the plant has a hull, such as for an almond, or a husk, such as for a walnut. In any case, the present disclosure uses the terms husk and hull interchangeably.

A "shell" refers to the hard, inner pericarp (endocarp) surrounding the seed, nut, or kernel. Throughout this disclosure, shell may refer to either a whole and unground shell, or milled or otherwise ground shell, or a combination of whole and unground with ground or partially ground material. Depending on usage and need, whole shells (unground shells) may offer benefits that milled or ground shells cannot provide. For example, whole (unground) shells may increase the air porosity of roots, which may produce more vigorous root systems and plants.

Depending on the plant, one of ordinary skill in the art would understand the appropriate terminology for husk, hull, or shell. It is understood that the present disclosure contemplates any mixture of shells, hulls, and husks, obtained from any plant(s). The shells, hulls, and husks may have any size, from whole/unground to ground/milled particles of a particular size. Further, the mixture of shells, hulls, and husks can include other plant growth supporting products, such as coir or peat.

"Substrate medium" or "soilless medium" refers to a composition suitable for growing a plant that does not contain natural earth soil, in whole or primarily. For example, and in no way limiting, a substrate medium may be comprised of husks, shells, or hulls, such as almond husks, almond shells, or almond hulls. It is understood that a substrate medium may comprise any combination of husks, shells, and/or hulls from any plant(s), such as walnut, almond, pistachio, pecan, and peanut, and that that the husks, shell, and/or hulls may be whole (unground) or milled (ground). Further, the substrate medium may comprise whole and composted husks, shells, or hulls.

"Plant growth medium" encompasses any medium suitable for growing a plant. In a non-limiting example, a plant growth medium may comprise almond husks, almond shells, or almond hulls. A plant growth medium may comprise additional components for supporting plant growth, such as coir or peat. Of course, it is understood that a plant growth medium may comprise husks, shells, and/or hulls from any plant(s), such as walnut, almond, pistachio, pecan, and peanut, and that the husks, shell, and/or hulls may be whole (unground) or milled (ground).

A plant growth medium may comprise whole and composted husks, shells, or hulls.

"Plant" includes any of various photosynthetic, eukaryotic, multicellular organisms of the kingdom Plantae characteristically producing embryos, containing chloroplasts, and having cellulose cell walls. The present application includes both angiosperm (monocots and dicots) and gymnosperm plants, and includes whole plant as well as any part of a plant, such as leaf, root, shoot, stolon, tuber, runner, cane, cutting, seed, flower, etc. In no way limiting, the present methodology and compositions may be used for growing tomato, potato, soybean, maize, turfgrass, rice, oat, wheat, barley, sorghum, orchid, iris, lily, onion, palm, pine, tobacco, Eucalyptus, Populus, Liquidamber, Acacia, teak, mahogany, cotton, tobacco, mustards, orange, apple, pear, cherry, peach, plum, melons, grapes, strawberry, blackberry, raspberry, blueberry, cranberry, loganberry, bananas, citrus, sugar beet, broccoli, cauliflower, celery, lettuce, spinach, eggplant, pumpkin, squash, cassava, sweet potato, pepper, poinsettia, geranium, almond, peanut, pistachio, walnut, bean, alfalfa, carrot, strawberry, lettuce, oak, maple, walnut, rose, mint, squash, daisy, geranium, avocado, artichoke, olives, coconut, jojoba, and cactus.

"Small fruit" includes any of strawberry, raspberry (any color), blackberry, blueberry and/or black-raspberry. A small fruit refers to the plant itself as a whole, as well as any part thereof, such as a berry, seedling, stolon, runner, seed, leaf, cane, or root cutting.

"Whole Composted Shell, Whole Composted Hull/Husk" refers to nut shells and hulls/husks that are not ground or milled, but rather composted and then used as a growth medium. The composted shells and hulls/husks can be further treated before use as a growth medium and can be used with other components, such as coir or peat.

A. Plant Growth Medium

The description contemplates a plant growth medium comprising the hulls, shells, or husks from nuts or seeds, such as almond hulls, shells, and/or husks. The instant growth medium may be used for growing any plant, for example, small fruit plants, such as strawberry, raspberry (any color), blackberry, blueberry and/or black-raspberry.

The plant growth medium is distinct from using, for example, almond material as a soil ameliorant (mulch and or surface applied). That is, in one embodiment, the instant plant growth medium is a treated and manufactured almond product, whereas a soil ameliorant is an additive to a soil. In an embodiment, the plant growth medium may be soilless.

In another embodiment, a plant growth medium may comprise additional components for supporting plant growth, such as coir or peat.

Illustrative Almond Shell and Husk Growing Substrate Medium

As explained above, the description provides methodology for creating and formulating a plant growth medium for use for growing a plant, such as small fruit (strawberry, raspberry (any color), blackberry, blueberry and black-raspberry). Accordingly, in one embodiment, a processed and formulated product can be denoted as an "Almond Substrate" also referred to herein as a "Plant Growth Medium."

An Almond Substrate can be variously formulated according to crop requirement and growing situation. In most situations, however, a product is intended for use in containers, including; open top troughs, circular, rectangular and triangular pots and polyethylene (and other plastics) water and growing media retaining products. Such substrate may also find use in commercial retail markets, such as in bags for growth medium, soilless potting medium, etc.

Ingredients

Raw, untreated almond shell and almond husk direct from the almond hulling and processing factory or almond grower. It is understood that raw, untreated almond shell may be used directly without milling, or it may be further treated. In one embodiment, the present disclosure contemplates a mixture having any combination or percentage of both whole (unmilled) almond shell and milled almond shell. In other embodiments, the shells are whole composted with or without further treatment.

Treatments

Almond shell to be milled (chopped and ground) to provide a mixture of various grades of material. This material can be passed through a sieve process to grade out material into grain sizes from <0.1 mm to 12 mm in size bands of 0.5-12 mm. In some embodiments, the almond shell is not milled. In other embodiments, the shells are whole composted with or without further treatment.

Almond hull in a dry state is similarly milled and sieved. In some embodiments, the almond hull is not milled. In other embodiments, the hulls are whole composted with or without further treatment.

In embodiments where the almond shell or hull is milled, the sized product will be reconstituted to give prescribed Water Holding Capacity (WHC) and Air Filled Porosity (AFP) characteristics to suit each crop and growing conditions.

Prior to reconstitution, each product line is assessed for its chemical characteristics, such as the presence or absence of key beneficial or detrimental salts and minerals. In addition, the product further processing is to provide a suitable growing medium.

In some embodiments, an illustrative plant growth medium may involve steps, such as washing, buffering, pH adjustment, drying, and other various end user preferences.

Washing with clean water to remove excess salts of chloride, sodium and silicates etc. Washing to achieve an electrical conductivity <300 microseimens for salt sensitive crops and <500 microseimens for salt tolerant crops.

Buffering with a solution of calcium nitrate, calcium carbonate or calcium bicarbonate (other calcium products such as calcium sulphate). At times this process will be combined with the washing process. The buffering aids in the removal of salts. At the end of buffering the proprietary almond substrate product will contain 10-50 ppm Ca and 5-50 ppm nitrate as a normal range.

pH (acidity and alkalinity) End product requiring a low pH and or bicarbonate (HCO) will be treated with a solution containing either phosphoric acid or ammonium nitrate or a combination of the two or sulphuric acid or proprietary products such as Nfuric acid (sulphuric acid with urea). An end product requiring a high pH (alkaline) will be treated with either calcium carbonate or calcium sulfate, or a mixture thereof.

Drying Product will be finished according to end use with a water content of 10-100% of its WHC.

Product Presentation The product will be variously prepared according to end use; bulk, compacted bulk, filled containers, bagged loose fill, and bagged compacted.

End User Requirements End uses will variously prescribe the addition of fertilizer and trace elements as dry granular and powder compounds and branded controlled release formulations.

Composting

In other embodiments, the instant plant growth medium may be composted to enhance the physical and chemical characteristics of the finished products. The present disclosure contemplates composting any mixture of shells, hulls, and husks, obtained from any plant(s). The shells, hulls, and/or husks may have any size, from whole/unground to ground/milled particles of a particular size. Further, the mixture of shells, hulls, and/or husks can include other plant growth supporting products, such as coir or peat.

With a low carbon footprint, composting is used to minimize the carryover of pathogens, as well as lessen the chance for self-combustion. As known in the art, any composting methodology may be used, used as self-generated composting, where the native biological characteristics of the ingredients, provided with suitable environment, will process from fungal, bacterial and enzyme recompositioning. Generated composting refers to where the environment is modified and/or additives used to guide or propel the composting process in a particular direction or speed. The composting being either in a turned windrow system or in a closed container that might also be rotated. To maintain moisture, water may be added to ensure the materials remain biologically active. Because the instant hulls, husks, and/or shells contain large amounts of carbon, but not necessarily sufficient nitrogen, stimulants such as nitrogenous compounds, may be added where the native biological charge is low.

B. Plant Growth

The instant growth medium can be used to support plant growth, such as small fruit plant growth. Such product would be a direct substitute for alternative medium including soil, peat, and/or coco fiber substrates, and crop planting and growing would follow the conventions established in commerce. In some embodiments, the instant growth medium may comprise peat or coir.

Specific Examples are provided below to demonstrate preparation of an illustrative plant growth medium. The Examples are illustrative and non-limiting.

EXAMPLE 1

Plant Growth Substrate Medium from Milled and Buffered Almond Shell

Growing Substrate

The present disclosure describes the process of creating and formulating a plant growing medium for use with any plant, such as a small fruit plant (strawberry, raspberry (any color), blackberry, blueberry and black-raspberry). In one embodiment and in no way limiting, The processed and formulated product made from almond shells and hulls may be denoted an "Almond Substrate," also referred to herein as a "Plant Growth Medium."

The illustrative Almond Substrate being variously formulated according to crop requirements and growing situations. In most situations, the product is intended for use in containers, including; open top troughs, circular, rectangular and triangular pots and polyethylene (and other plastics) water and growing media retaining products.

Ingredients

Raw, untreated almond shell and almond hull direct from the almond hulling and processing factory or almond grower. In some embodiments, almond shell is not milled and may be used in its composted form.

Treatments

Almond shell to be milled (chopped and ground) to provide a mixture of various grades of material. This material is then passed through a sieve process to grade out material into grain sizes from <0.1 mm to 12 mm in size bands of 0.5-12 mm. In some embodiments, almond shell is not milled and may be used in its composted form.

Almond hull in a dry state is similarly milled and sieved. In some embodiments, almond hull is not milled and may be used in its composted form.

In embodiments where the shells and/or hulls/husks are milled to create sized product, the sized product will be reconstituted to give prescribed Water Holding Capacity (WHC) and Air filled Porosity (AFP) characteristics to suit each crop and growing conditions.

Prior to reconstitution, each product line is assessed for its chemical characteristics, such as the presence or absence of key beneficial or detrimental salts and minerals. In addition, the product further processing is to provide a suitable growing medium.

In some embodiments, an illustrative product will employ:

Washing with clean water to remove excess salts of chloride, sodium and silicates etc. Washing to achieve an electrical conductivity <300 microseimens for salt sensitive crops and <500 microseimens for salt tolerant crops.

Buffering with a solution of calcium nitrate, calcium carbonate or calcium bicarbonate (other calcium products such as calcium sulphate). At times this process will be combined with the washing process. The buffering aids the removal of salts. At the end of buffering the proprietary almond substrate product will contain 10-50 ppm Ca and 5-50 ppm nitrate as a normal range.

pH (acidity and alkalinity) Adjusting: End product requiring a low pH and or bicarbonate (HCO) will be treated with a solution containing either phosphoric acid or ammonium nitrate or a combination of the two or sulphuric acid or proprietary products such as Nfuric acid (sulphuric acid with urea). An end product requiring a high pH (alkaline) will be dressed with either calcium carbonate or calcium sulfate. Or a mixture.

Drying Product will be finished according to end use with a water content of 10-100% of its WHC.

Product Presentation: The product will be variously prepared according to end use; bulk, compacted bulk, filled containers, bagged loose fill and bagged compacted.

End User Requirements: End uses will variously prescribe the addition of fertilizer and trace elements as dry granular and powder compounds and branded controlled release formulations.

EXAMPLE 2

Plant Growth Substrate Medium from Whole Shell and Hull

As explained above in Example 1, a plant growth substrate medium may be prepared from shell and hull that are milled (chopped and ground). Milled shell and hull provide material that can be reconstituted by particle size to provide specific substrate characteristics based on plant requirements.

Alternatively, or together with milled material, whole shells and hulls may be used for providing a plant growth substrate medium. That is, composted and unground whole shells and hulls/husks may be used as a substrate medium.

In one embodiment, whole shells and hulls are used in a composted state as the sole component of the substrate. For example, whole shells and hulls from almond trees may be used as the sole component of a growth substrate.

In some embodiments, the whole shells and hulls/husks are composted, washed, buffered, pH adjusted, and dried as described in Example 1.

In another embodiment, whole shells and hulls/husks are used in a mixture with milled shells, hulls, and husks, as described in Example 1. In this respect, for example, whole almond shells and hulls are mixed with milled or ground shells and hulls. In further embodiments, the mixture of whole shells and hulls, along with milled shells, hulls, and husks, are composted, washed, buffered, pH adjusted, and dried as described in Example 1.

EXAMPLE 3

Plant Growth in Plant Growth Medium

A plant growth medium, such as an Almond substrate, is prepared as described according to end user requirements. As illustration of the process of use, which follows conventional growing techniques, the below description contemplates growing a strawberry plant in such substrate.

The substrate is supplied within an open bag, open pot, or trough. The pots are placed onto field ridges, flat ground, or a support system as conventionally used. The product is to be hydrated by irrigation water prior to use, fertilizer products would be used. The product is ready to use when the moisture and fertilizer concentration is stabilized.

As an example, and not limiting in any way, a raspberry plant would be planted either as a root, cane, or plug plant, as per conventional commercial production. The roots, canes, or plug plants either totally buried within the medium as per conventional methods and covered with an additional layer of almond substrate or coir, for increasing water holding capacity during initial growth phase.

Once planted, the plant would be irrigated (watered) or "fertigated" (water plus fertilizer) according to the specific requirements of the plant, location, and substrate combination, as would be the norm in commercial production.

Figure 2:
FIG. 2: Photograph of a red raspberry plant grown in ground almond shells, taken at 9 months post-planting.

As shown in FIG. 1, a three-month-old red raspberry plant grown in whole composted almond shell has a developed root system. In contrast, and as shown in FIG. 2, a similarly grown nine-month-old red raspberry plant grown in ground almond shell substrate has a measurably less developed root system. As shown in FIG. 2, the raspberry plant still produces harvestable fruit, but the plant is not as vigorous as a similar plant grown in whole composted substrate.

At the end of the cropping period the substrate is either taken to waste, applied as a manure to open ground, or fumigated for re-use (re-use may be over a period of several years).

EXAMPLE 4

Plant Growth Medium and Composting

Using ingredients as previously described in Examples 1-3, composting is a means to enhance the physical and chemical characteristics of the finished products. Additionally, the process of composting is used to minimise the carryover of pathogens. By composting the ingredients will be less likely to self-combust. The present application contemplates any composting methodology, including a turned windrow system or closed rotating system.

Composting provides several benefits, including:

During the turning and rotation process materials are physically altered in some cases reducing the need for grinding (as per Example 1).

Reactive carbohydrates in and on the substrate are broken down to provide more stable chemicals thus reducing molds and enhancing nutrient availability.

The creation of heat reduces the risk of pathogen carryover.

By composting the structure of the shell and husk material becomes more open to provide a more absorptive product.

In one embodiment, and relevant to the use of whole shells and husks, composting may provide an alternative to ground and buffered material. For example, and for use with whole shells and husks that are not further treated with milling and buffering, composting may provide a more open and absorptive product.

In another embodiment, the washed and buffered materials obtained from ground shells, husks, and/or hulls, as described in Example 1, may be composted. The composting process considers proportions for each ingredient and customer requirements. The composted product may be combined with other growth media, such as peat and coir.

EXAMPLE 5

Product

This example provides illustration of growing media mixes where shell and husk ingredients are components of a product.

Shell and husk ingredients provide:

Particular physical, chemical advantages of the described products that are advantageous to the crop plants being grown.

Economic advantage over other ingredients.

Reasons for mixing Almond material.

To affect a positive change in moisture holding capacity of either component. Almond product generally being able to increase the oxygen capacity of a substrate where the other component is usually dense and prone to water logging.

To utilise the benefit of the nutrient content of almond material in mixtures that would otherwise have a low ambient nutrient content.

Almond providing a high stability for substrates that need to retain structure for long periods. Ground whole, or composted almond shell enhances a peat or coir substrate in a long-life situation, for example, blueberries potted for multiple years.

Other embodiments will be apparent to anyone skilled in the art from consideration of the specification and practice of the description herein. It is intended that the specification and examples be considered as exemplary only, with a true scope and spirit of the invention being indicated by the following claims.

What is claimed is:

1. A plant growth medium comprising whole unground almond shells,
   wherein the whole unground almond shells are composted, washed, buffered, pH adjusted, and/or dried; and
   wherein the plant growth medium is a processed and formulated product that does not comprise soil or exogenously added compost.

2. The plant growth medium of claim 1, further comprising one or more plants grown in the plant growth medium that does not comprise soil or exogenously added compost.

3. The plant growth medium of claim 1, wherein said medium further comprises ground and buffered almond shells and hulls.

4. The plant growth medium of claim 1, further comprising peat or coir.

5. A plant growth medium comprising whole unground composted shells, husks, and/or hulls, wherein said shells, husks, and/or hulls are composted, washed, buffered, pH adjusted, and/or dried; and
   wherein the plant growth medium is a processed and formulated medium that is soilless and does not comprise exogenously added compost.

6. The plant growth medium of claim 5, wherein said whole unground composted shells are almond shells.

7. The plant growth medium of claim 6, further comprising ground shells, husks, and/or hulls.

8. The plant growth medium of claim 5, wherein said whole composted shells are selected from almond shells, walnut shells, pecan shells, pistachio shells, hazel nut shells, and/or peanut shells, and said medium further comprises peat or coir.

9. A soilless composition comprising whole and unground shells selected from the group consisting of almond, walnut, pistachio, pecan, and/or peanut, wherein the shells are composted, washed, buffered, pH adjusted, and/or dried and said soilless composition does not comprise exogenously added compost.

10. The soilless composition of claim 9, wherein said composition comprises whole and unground almond shells.

11. The soilless composition of claim 9, wherein said composition comprises whole and unground walnut shells.

* * * * *